(12) United States Patent
Bezukov

(10) Patent No.: US 8,601,495 B2
(45) Date of Patent: Dec. 3, 2013

(54) SAP INTERFACE DEFINITION LANGUAGE (SIDL) SERIALIZATION FRAMEWORK

(75) Inventor: Vladislav Bezukov, Sandhausen (DE)

(73) Assignee: SAP AG, Walldorf (DE)

( * ) Notice: Subject to any disclaimer, the term of this patent is extended or adjusted under 35 U.S.C. 154(b) by 1644 days.

(21) Appl. No.: 11/644,389

(22) Filed: Dec. 21, 2006

(65) Prior Publication Data

US 2008/0154981 A1    Jun. 26, 2008

(51) Int. Cl.
 *G06F 9/44* (2006.01)
 *G06F 15/16* (2006.01)

(52) U.S. Cl.
 USPC .......................................... 719/319; 709/246

(58) Field of Classification Search
 USPC ....................................................... 719/319
 See application file for complete search history.

(56) References Cited

U.S. PATENT DOCUMENTS

| | | | |
|---|---|---|---|
| 7,533,102 B2 * | 5/2009 | Kalia et al. ............................. | 1/1 |
| 7,546,226 B1 * | 6/2009 | Yeh et al. .......................... | 703/2 |
| 7,620,724 B2 * | 11/2009 | Weisman et al. ............. | 709/227 |
| 2003/0233365 A1 * | 12/2003 | Schmit et al. .................. | 707/100 |
| 2004/0187140 A1 * | 9/2004 | Aigner et al. .................. | 719/328 |
| 2005/0066058 A1 * | 3/2005 | An et al. ........................ | 709/246 |
| 2006/0047679 A1 * | 3/2006 | Purdy et al. ................... | 707/102 |
| 2008/0091409 A1 * | 4/2008 | Anderson ......................... | 704/9 |

OTHER PUBLICATIONS

Gabriel Ciobanu et al "An international journal of computing and informatics", 2004.*

* cited by examiner

*Primary Examiner* — Abdou Seye

(74) *Attorney, Agent, or Firm* — Mintz Levin Cohn Ferris Glovsky and Popeo, P.C.

(57) ABSTRACT

In one aspect, there is provided a computer-implemented method. The method may include receiving a description of a web service. A serialization framework may be used to convert the received description to the object model associated with the web service by using a layering of the deserialization process (library and metamodel layers) as well as integrating various registry mechanisms such as QName registry for inter-namespace inter-document declarations, namespace serializer registry, and entity container in the serialization framework. Related systems, apparatus, methods, and/or articles are also described.

3 Claims, 6 Drawing Sheets

| METAMODEL OBJECTS (OR ENTITIES) | MAPPINGS | DESERIALIZED WSDL |
|---|---|---|
| Definition | | 505  510a<br>`<wsdl:definitions`<br>`    targetNamespace="http://xml.sap.com/2005/02/esi/sid1/if1">`<br>`    xmlns:wtns=" http://xml.sap.com/2005/02/esi/sid1/if1"`<br>`    xmlns:wsdl="http://schemas.xmlsoap.org/wsdl/"`<br>`    xmlns:xsd=http://www.w3.org/2001/XMLSchema>`  510b<br>`<wsdl:import`<br>`namespace="http://xml.sap.com/2005/02/esi/sid1/if2"`<br>`         location="..."/>`<br>`<wsdl:types>`                                              510c<br>`<xsd:schema`<br>`    xmlns:xsd="http://www.w3.org/2001/XMLSchema"`<br>`    xmlns:xtns="http://xml.sap.com/2005/02/esi/sid1/if1"`<br>`    targetNamespace="http://xml.sap.com/2005/02/esi/sid1/if1"`<br>`    attributeFormDefault="qualified">`  540a<br>`    <xsd:complexType name="t1Name">`<br>`        <xsd:sequence>...</xsd:sequence>`<br>`    </xsd:complexType>`                540b<br>`    <xsd:complexType name="t2Name">`<br>`        <xsd:sequence>...</xsd:sequence>`<br>`    </xsd:complexType>`<br>                                     520a<br>`    <xsd:element name="opName">`<br>`        <xsd:complexType>`<br>`            <xsd:sequence>`  530a<br>`                <xsd:element name="p1Name" type="xtns:t1Name">`<br>`            </xsd:sequence>`<br>`        </xsd:complexType>`<br>`    </xsd:element>`                     520b<br>`    <xsd:element name="opNameResponse">`<br>`        <xsd:complexType>`<br>`            <xsd:sequence>`  530b<br>`                <xsd:element name="p2Name" type="xtns:t2Name" minOccurs="0">`<br>`            </xsd:sequence>`<br>`        </xsd:complexType>`<br>`    </xsd:element>`<br>`</xsd:schema>`<br>`</wsdl:types>`                     520c<br>`<wsdl:message name="opName">`<br>`    <wsdl:part name="parameters" element="wtns:opName"/>`<br>`</wsdl:message>`                   520d<br>`<wsdl:message name="opNameResponse">`<br>`    <wsdl:part name="parameters" element="wtns:opNameResponse"/>`<br>`</wsdl:message>`              510d<br>`<wsdl:portType name="if1Name">`  520e<br>`    <wsdl:operation name="opName">`<br>`        <wsdl:input message="wtns:opName"/>`<br>`        <wsdl:output message="wtns:opNameResponse"/>`<br>`    </wsdl:operation>`<br>`</wsdl:portType>`<br>`</wsdl:definitions>` |
| Interface<br>if1:if1Name<br>Style=RPC | | |
| Interface<br>if2:if2Name<br>Style=rpc | | |
| Operation<br>if1:opName<br>opRequest:<br>{p1Name,...}<br>opResponse:<br>{p2Name,...}<br>Faults:<br>{p3Fault,...} | | |
| Parameter<br>if1:p1Name<br>type: t1Name | | |
| Parameter<br>if1:p2Name<br>type: t2Name<br>optional=true | | |
| Parameter<br>if1:p3Fault<br>type: <nil> | | |
| Type<br>if1:t1Name | | |
| Type<br>if1:t2Name | | |

FIG. 5

SAP INTERFACE DEFINITION LANGUAGE (SIDL) SERIALIZATION FRAMEWORK

FIELD

The subject matter described herein generally relates to data processing. More particularly, the subject matter described herein relates to a serialization framework to enable a metamodel for mapping between web service descriptions and metamodel objects.

BACKGROUND

There is, and will continue to be, advances and changes in how enterprises conduct business. Whether these advances and changes occur through growing competition and globalization, mergers and acquisitions, or a revamping of business models, the key for success will often depend on how quickly the enterprise's information technology (IT) organization can adapt to evolving business needs. Therefore, a major challenge to these enterprises is how they handle change.

For organizations to enable business agility, they must ensure that enterprise applications are not only high-performance business engines driving efficiencies, but also that they become flexible building blocks of future business systems. A recent promising solution has risen in the form of services. A service, such as a Web service, application, or program, represents a self-contained, self-describing piece of application functionality that can be found and accessed by other applications. A service is self-contained because the application using the service does not have to depend on anything other than the service itself, and self-describing because all the information on how to use the service can be obtained from the service itself. The descriptions are centrally stored and accessible through standard mechanisms.

A service may be described by a WSDL (Web Services Description Language) document. WSDL is an XML format (also providing an XML Schema) for describing services as a set of endpoints operating on messages containing either document-oriented or procedure-oriented information. For example, the WSDL description of the service may describe the service (or web service) including how to instantiate the web service, how to interact with the web service, the format of any calls to the web service, and the format of any data sent to the web service. When a client application is developed to interact with the web service, it must comply with the WSDL description to interact with the web service. Likewise, the web service should comply with its WSDL description. At present, two specifications specify WSDL (see WSDL version 1.1 and WSDL version 2.0 at www.w3.org).

SUMMARY

In one aspect, the method includes receiving a description of a web service. A serialization framework is used to convert the description to one or more WSDL statements associated with the web service. The serialization framework also enables conversion of the one or more WSDL statement to one or more metamodel objects by using a metamodel.

In some variations, the method further includes initiating a library application to control in the serialization framework one or more of the following: a parser, a registry, a serializer, and a metamodel. The serialization framework is defined to include a parser, a registry, and a metamodel for generating metamodel objects. The method may receive the description as a WSDL description of the web service. The one or more metamodel object may be persisted in a class library. The client proxy may be generated based on one or more metamodel objects. The one or more metamodel objects may be used to generate a proxy without regard to the WSDL's version and syntax.

Articles are also described that comprise a tangibly embodied machine-readable medium embodying instructions that, when performed, cause one or more machines (e.g., computers, etc.) to result in operations described herein. Similarly, computer systems are also described that may include a processor and a memory coupled to the processor. The memory may include one or more programs that cause the processor to perform one or more of the operations described herein.

In some implementations of the subject matter described herein, advantages may be realized, such as lower cost client application and web service development, faster client application and web service development since the client application and web service may be implemented without regard to WSDL (Web Service Description Language) version and syntax.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

FIG. 5 depicts metamodel object mapped to serialized WSDL statements; and

DETAILED DESCRIPTION

Web service enablement of client business applications is rapidly becoming a growing challenge when developing applications. In particular, a client application that interacts with web services may be required to incorporate a wide variety of specifications (e.g., WSDL, WS-*, SOAP, XML Schema), knowledge of updates to the specification (e.g., WSDL 1.1 versus WSDL 2.0), varying interpretations of specifications (e.g., WS-I Basic Profile 1.0.), and various proprietary vendor exchange formats (e.g., COM, BinaryXML, SAP-Features, and the like), all of which impose a significant burden when developing client applications and web services. Moreover, the web service may be described in a WSDL-document-oriented style or in a WSDL-RPC (also referred to as procedure-oriented) style resulting in two additional variations of WSDL. The foregoing leads to increased complexity when implementing client applications as well as web services applications.

Figure 1:
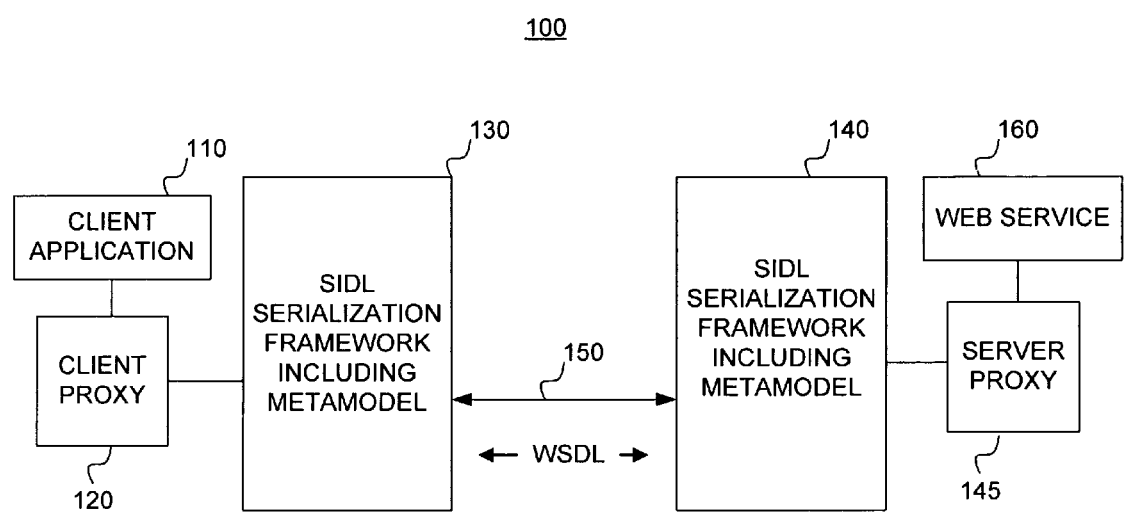
FIG. 1 depicts a block diagram of a system implementing a serialization framework.

FIG. 1 depicts a system 100 including a client application 110 (e.g., a user interface) for interacting with a web service 160 through a client proxy 120, a network 150 (e.g., the Internet or any other communication mechanism), and a server proxy 145. The web service 160 is described by a WSDL document.

To avoid client application 110 as well as the client proxy 120 from having to implement WSDL-specific syntax and associated complexities, the subject matter herein relates to a SIDL serialization framework, such as SIDL serialization frameworks 130 and 140. The SIDL serialization framework may provide a layered framework including a registry and a library for deserializing a description of a web service, such as a WSDL description. The deserialized description enables one or more metamodels to generate metamodel objects. The metamodels of SIDL serialization framework 130 and 140 provide an additional layer of abstraction, and thus enable client proxy 120 and server proxy 145 to handle calls (i.e., make and receive calls) without regards to the specifics of WSDL version and syntax. After the SIDL framework deserializes a WSDL description of a web service, the metamodels (included with frameworks 130 and 140) map the serialized WSDL descriptions to metamodel objects. The metamodel objects include methods and data, are callable through an interface, such as an Application Program Interface (API), and are used to generate client proxy 120 and server proxy 140.

At runtime, the client proxy 120 (created based on the metamodel 130 including metamodel objects) is used in conjunction with client application 110 to interact with web service 160.

On the server side, at runtime, the server proxy 145 (created based on the metamodel 140 including metamodel objects) is used in conjunction with web service 160 to interact with client application 110. In some implementations, the use of metamodels 130 and 140 simplify client proxy 120 and server proxy 145 generation since the complexities of WSDL and its extensions are no longer required.

Figure 2:
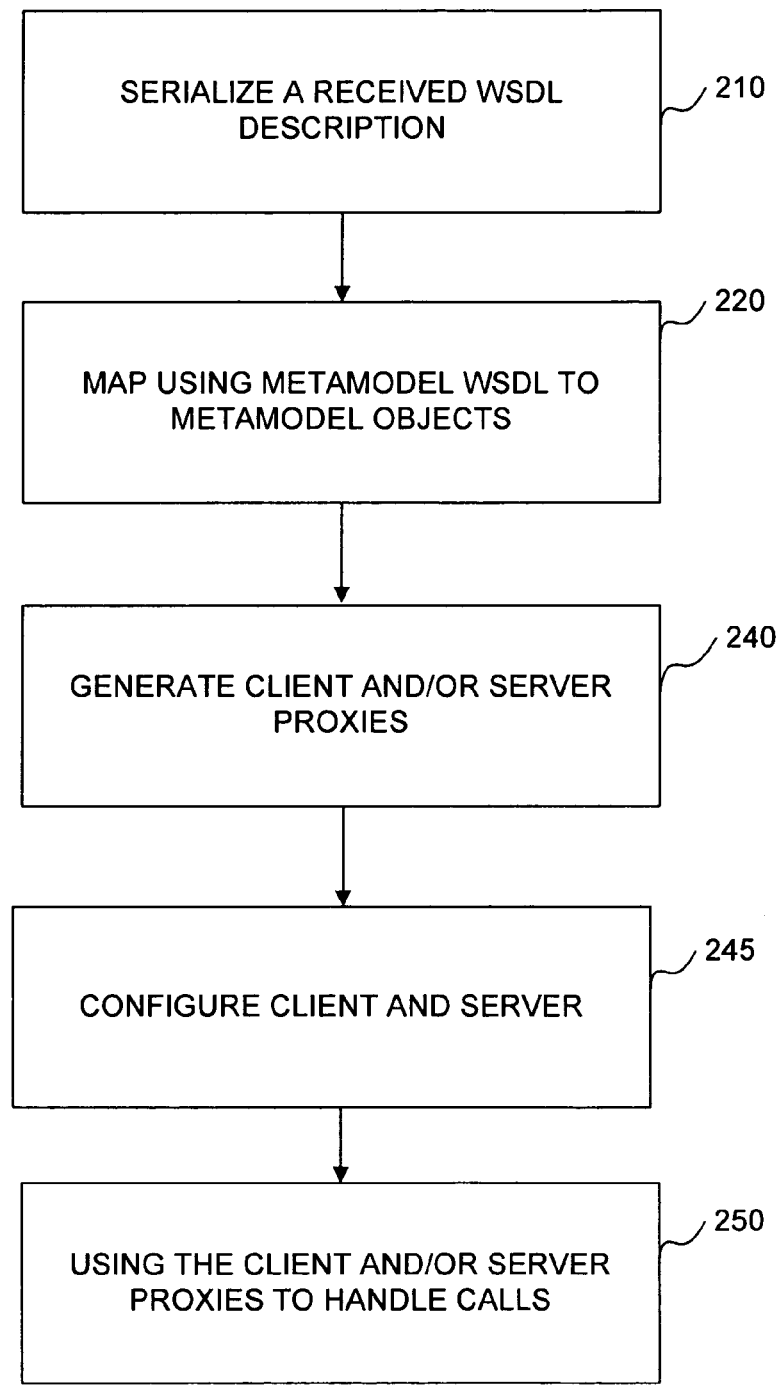
FIG. 2 depicts a flow chart for serializing WSDL.

FIG. 2 depicts a method 200 for use with system 100. At 210, a WSDL description of web service 160 is received by the SIDL serialization framework, such as frameworks 130 and 140. For example, during the design of client application 110, a WSDL description may be received by SIDL serialization framework 130 describing web service 160. The term "framework" refers to a structure of interrelated programs, applications, or components. Deserialization decomposes the WSDL into the WSDL statements depicted in the right hand column of FIG. 5. The WSDL may be mapped to metamodel objects using the metamodel of the SIDL framework 130 or 140. For example, WSDL statements are converted to metamodel objects (or entities), as described further below and depicted in FIG. 5. At 240, the client and server proxies 120 and 145 are generated using the metamodel objects. At 245, the client and server are configured (e.g. security). At 250, client application 110 calls client proxy 120, and client proxy 120 makes a call (e.g., sending a SOAP message formatted in accordance to the WSDL description of web service 160) through network 150 to server proxy 145, which converts the request message to objects for use by web service 160.

Figure 3:
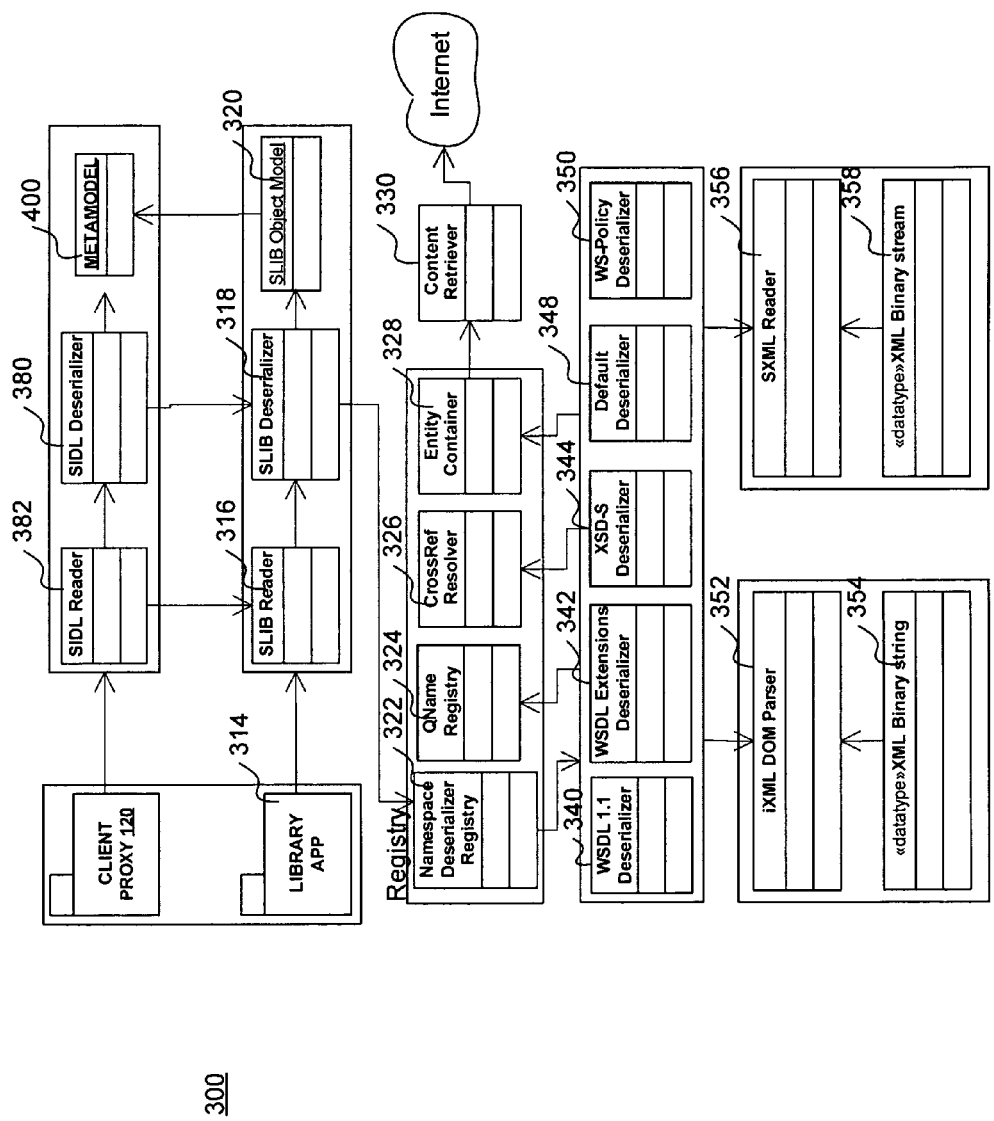
FIG. 3 depicts a SIDL serialization framework.

FIG. 3 depicts an implementation of a SIDL serialization framework 300 that includes an intermediate library layer 314-320 and registry entities 322-330. The XML DOM (Document Object Model) parser 352 parses a WSDL document along with its extensions (e.g., schemas, policies, proprietary elements, etc) for a web service with a data type of XML binary string 354. There is also a possibility to use a SXML reader 356 (StAX) which generates SXML Nodes (Infoset) instead of DOM reading the XML serial stream 358.

The registry entities 322-350 register all of the serializers used in framework 300 to convert the WSDL (and its extensions) to library objects. For example, the registry may invoke a WSDL 1.1 library deserializer to convert the XML of the WSDL 1.1 to a library object for conversion by the library object model 320. If the XML indicates (by means of element namespaces) that a WSDL extension is included in the document, then the registry enables WSDL extensions deserializer 342. Similarly, if the XML indicates that XSD is in the document, then the registry enables XSD deserializer 344 to convert the XSD to a library object. If the XML indicates that WS-Policy (Web Services Policy 1.2—Framework) is in the document, WS-Policy deserializer 350 is invoked by the registry. There is also provided a mechanism for plugging in a new library deserializer into the registry. In addition, a default deserializer 348 may be invoked by the registry in case no deserializer for a given namespace is registered. In some cases, an XML binary string that is parsed may have a plurality of portions, each requiring deserialization by one or more of the registered deserializers 340-350.

There is also a registry component responsible for the declaration/references between the library objects. This registry component is known as a QName registry 324 and is used to register (declare) a library object and to check when a QName reference occurs if the reference is valid. The Qname registry supports forward- and cross-references, whereas the cross reference resolver 326 may be used to resolve cross references. The entity container 328 may also be used for external references to resources by an URI (Uniform Resource Locator). When a library deserializer comes across such a resource reference (e.g., wsdl:import), it looks for the resource in the entity container, and in case the resource is not yet available in the container, it calls the content retrieval component 330 of the registry which reads the content from the resource as specified by the resource URI.

The library layer 314-320 may control which serializers (or deserializers) are invoked. For example, the library object model 320 may determine, using registry 322, the namespaces associated with the XML elements and determine the corresponding deserializers required to convert the XML element to a library object. Examples of WSDL 1.1 library objects are as follows: wsdlDefinitionObject, wsdlPorttypeObject, wsdlMessageObject, and the like. Examples of objects for the XSD library are as follows: xsdElementDeclaration, xsdSimpleTypeDefinition, and the like. Each library has its own set of objects, but all of the libraries have a common API (i.e., a library-API) to make common operations (e.g., to query an object library namespace or to set a parent-child relationship). The metamodel 400 (described further below with respect to FIG. 4) may be used to convert library objects generated by library object model 320 to metamodel objects suitable for generation of client proxy 120.

Figure 4:
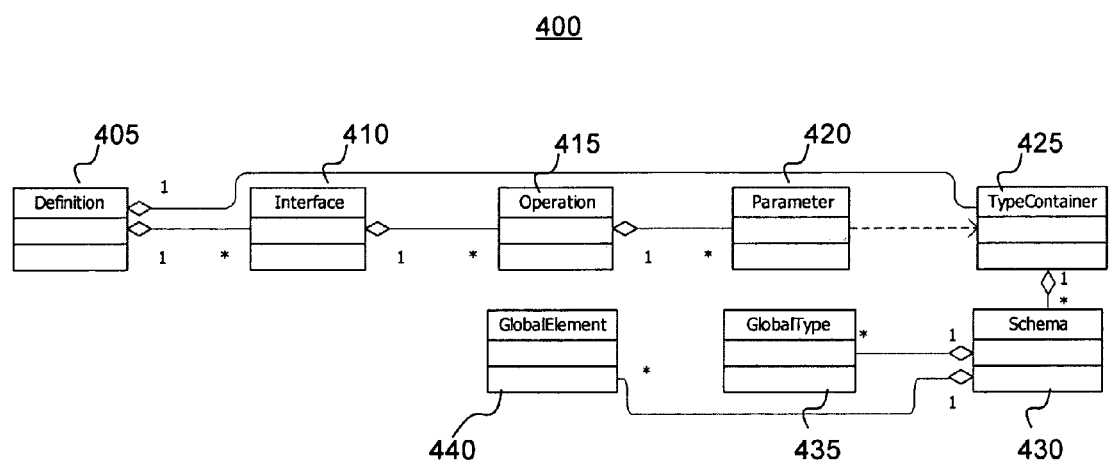
FIG. 4 depicts a block diagram of the metamodel of the serialization framework.

FIG. 4 depicts an example of a metamodel for use with SIDL serialization frameworks 130 and 140. The metamodel 400 is a metamodel that may decouple a program, such as client application 110 or web service 160, from the specific properties, implementation, and variations (e.g., versioning and document style) associated with a serial technology, such as WSDL.

The metamodel 400 includes the following entities (or objects): a definition 405, an interface 410, an operation 415, a parameter 420, a type container 425, a schema 430, a global type 430, and a global element 440. An entity is a single object, which can be modeled using entity-relationship diagrams.

The definition 405 functions as a so-called "root" for metamodel 400. The definition 405 may include one or more interfaces 410 (e.g., an API), a single type container 425, and methods to instantiate the interfaces 410. The interfaces 410 may belong to multiple namespaces. In some implementations, there may be only one definition 405 per instance of the metamodel 400, and the definition may contain only one reference to a type container 425.

Although the serialization framework is used to serialize the metamodel 400 to WSDL 1.1, any other XML format may be used instead. Moreover, although the above describes a web service, any other program or application may be used instead. Moreover, the metamodel 400 may enable the use of common entities 405-440 as well as common mapping rules for those entities to WSDL.

FIG. 5 depicts an implementation of the metamodel 400 of FIG. 4 including mappings from performed by the metamodel 400. The mappings convert WSDL statements (right column) to metamodel objects (left column) and vice versa. Examples of metamodels, such as metamodel 400, may be found in co-pending U.S. patent application Ser. No. 11/644,807 to Bezrukov et al., entitled, "Unified Metamodel For Web Services Description", and filed Dec. 21, 2006.

Figure 6:
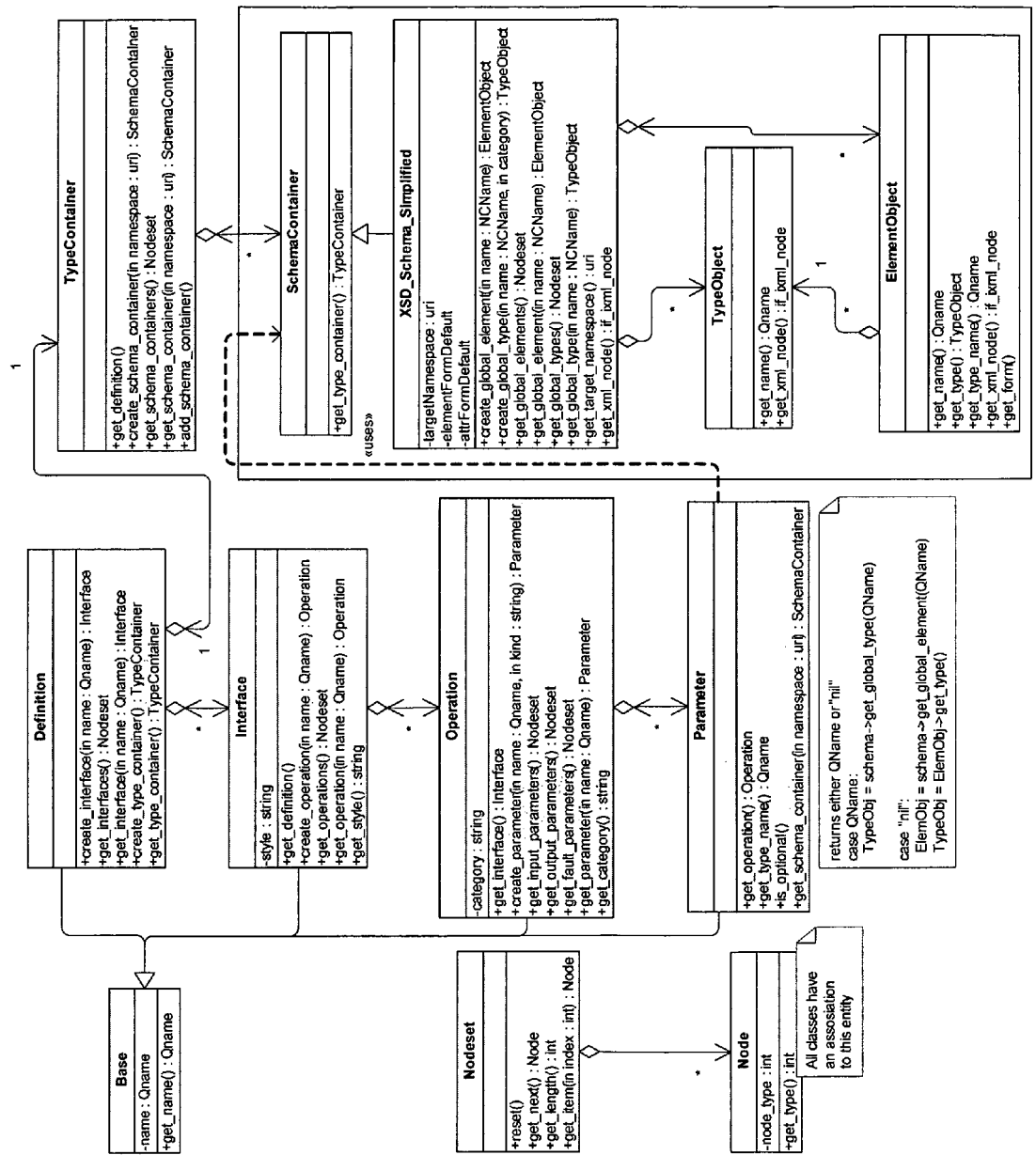
FIG. 6 depicts a SIDL model adapted for use with ABAP (available from SAP AG, Walldorf, Germany).

FIG. 6 depicts another example of metamodel 400 implemented specifically for a SAP ABAP environment. The metamodel 400 may be used to serialize an object to XML based on a serial description language, such as WSDL, as well as deserialize the XML to an object.

The subject matter described herein may be embodied in systems, apparatus, methods, and/or articles depending on the desired configuration. In particular, various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Although a few variations have been described in detail above, other modifications or additions are possible. In particular, further features and/or variations may be provided in addition to those set forth herein. For example, the implementations described above may be directed to various combinations and subcombinations of the disclosed features and/or combinations and subcombinations of several further features disclosed above. In addition, the logic flow depicted in the accompanying figures and/or described herein do not require the particular order shown, or sequential order, to achieve desirable results. Other embodiments may be within the scope of the following claims.

What is claimed is:

1. An article comprising a non-transitory machine-readable medium embodying instructions that when performed by one or more machines result in operations comprising:
receiving a web services description language description of a web service;
using a serialization framework to convert the web services description language description associated with the web service to one or more metamodel objects by using a metamodel of the serialization framework;
defining the serialization framework to include a parser, a registry, and the metamodel;
initiating a library application to control in the serialization framework one or more of the parser, the registry, a serializer, and the metamodel; and
generating, based on the one or more metamodel objects included in the library, a client proxy and a server proxy for interacting with the web service irrespective of a version or a syntax of the web services description language description.

2. A computer-implemented method comprising:
receiving a web services description language description of a web service;
using a serialization framework to convert the web services description language description associated with the web service to one or more metamodel objects by using a metamodel of the serialization framework;
defining the serialization framework to include a parser, a registry, and the metamodel;
initiating a library application to control in the serialization framework one or more of the parser, the registry, a serializer, and the metamodel; and
generating, based on the one or more metamodel objects included in the library, a client proxy and a server proxy for interacting with the web service irrespective of a version or a syntax of the web services description language description.

3. A system comprising:
a processor; and
a memory, wherein the processor and the memory are configured to perform a method comprising:
receiving a web services description language description of a web service;

using a serialization framework to convert the web services description language description associated with the web service to one or more metamodel objects by using a metamodel of the serialization framework;

defining the serialization framework to include a parser, a registry, and the metamodel;

initiating a library application to control in the serialization framework one or more of the parser, the registry, a serializer, and the metamodel; and generating, based on the one or more metamodel objects included in the library a client proxy and a server proxy for interacting with the web service irrespective of a version or a syntax of the one or more web services description language description.

\* \* \* \* \*

UNITED STATES PATENT AND TRADEMARK OFFICE
CERTIFICATE OF CORRECTION

PATENT NO. : 8,601,495 B2
APPLICATION NO. : 11/644389
DATED : December 3, 2013
INVENTOR(S) : Vladislav Bezrukov It is certified that error appears in the above-identified patent and that said Letters Patent is hereby corrected as shown below:

In the Claims

Column 7, line 13, claim 3 should read as follows:

3. A system comprising:

a processor; and a memory, wherein the processor and the memory are configured to perform a method comprising:

receiving a web services description language description of a web service;

using a serialization framework to convert the web services description language description associated with the web service to one or more metamodel objects by using a metamodel of the serialization framework;

defining the serialization framework to include a parser, a registry, and the metamodel;

initiating a library application to control in the serialization framework one or more of the parser, the registry, a serializer, and the metamodel; and generating, based on the one or more metamodel objects included in the library a client proxy and a server proxy for interacting with the web service irrespective of a version or a syntax of the ~~one or more~~ web services description language description.

Signed and Sealed this
Fourth Day of February, 2014

Michelle K. Lee
*Deputy Director of the United States Patent and Trademark Office*